A. HARPER & J WURFFLEIN.
Saw Sets.
No. 124,489.  Patented March 12, 1872.
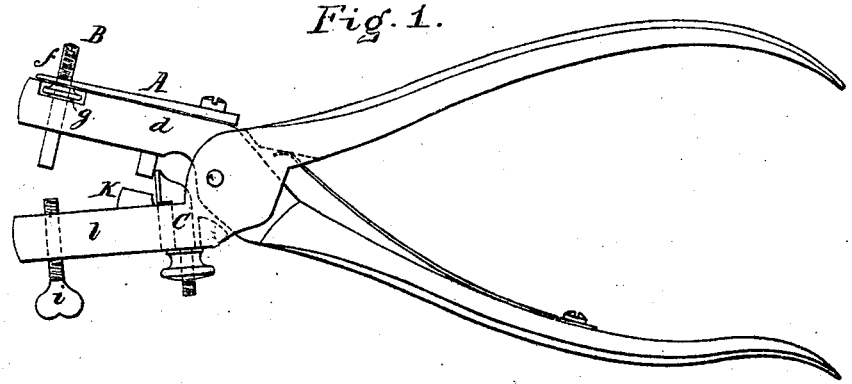
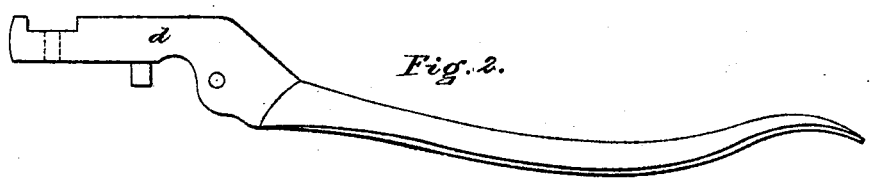
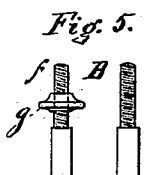
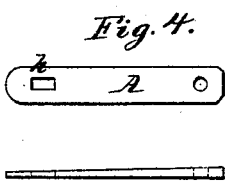
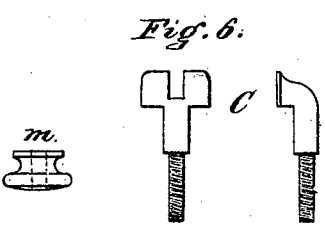
Witnesses.  Inventors.

UNITED STATES PATENT OFFICE.

ALBERT HARPER AND JOHN WÜRFFLEIN, OF WAVERLY HEIGHTS, PA.

IMPROVEMENT IN SAW-SETS.

Specification forming part of Letters Patent No. 124,489, dated March 12, 1872.

SPECIFICATION.

Specification describing certain Improvements in Saw-Sets, invented by ALBERT HARPER and JOHN WÜRFFLEIN, of Waverly Heights, in the county of Montgomery and State of Pennsylvania.

Our invention relates to the pincher saw-set in common use, whereby the teeth of the saw can be successively set by the simultaneous pressure of the adjustable setting-die and the adjustable blade-holders, the same being previously adjusted by the operator of the implement to suit the thickness of the blade; and our invention consists in the arrangement and combination of a spring with the adjustable blade-holder of one of the jaws of a pincher saw-set in such a manner that, as the operator closes the pincher-levers, the said spring-holder will come in contact with the blade before the setting-die comes in contact with the tooth to be set, and will firmly hold the said blade down in an immovable position while the tooth is afterward being bent or set down upon the usual anvil by the operator in further closing of the arms of the implement for the purpose; the object of our invention being to produce a gradual and steady bending of the teeth, and thus avoid the breaking off of any of the same—a result which frequently arises from the simultaneous and consequently jerking action of the setting-die and the blade-holders of the pincher-sets in common use.

Figure 1 is a side view of a pincher saw-set embodying our invention. Fig. 2 represents detached side and top views of the lever which produces the upper jaw of the implement. Fig. 3 represents detached side and top views of the lever which produces the lower jaw of the implement. Fig. 4 represents detached plan and edge views of the spring of the yielding blade-holder. Fig. 5 represents detached longitudinal sections of the stem and screw-nut of the said spring blade-holder. Fig. 6 represents detached front and side views of the adjustable sliding guard.

The jaw of the lever $d$ is inserted through a slot in the lever $e$, the two being secured together by a transverse pin like a pair of pinchers. The upper jaw carries the yielding blade-holder B and its spring A, the latter being attached to the upper side of $d$, and is slotted at $h$ so as to bear down upon the nut $g$, which can be screwed up and down around the stem $f$, which slides up and down in a hole made for the purpose down through the jaw of $d$. The nut $g$ is let into a recess in the upper side of the jaw of $d$, so that its upper side, when the nut is down on the bottom of the recess, will be in the same plane with the upper side of said jaw, and consequently, when the stem $f$ is pressed upward from below, the nut therein will raise the spring A, and, when released from the pressure, the spring A will force it downward with a power equivalent to the stiffness or strength of the said spring A. In the jaw of $e$ there is an adjustable rest-screw, $i$, which is directly opposite to the stem $f$ of the jaw of $d$, and can be screwed up or down to suit the required horizontal position of the saw-blade in its relation to the anvil $k$, upon which the saw-teeth are to be bent downward or set by the closing down upon them successively of the die on the under side of the jaw of $d$. The sliding guard C (see Figs. 1 and 6) is adjustably attached across the jaws of $e$ by means of a slot in the latter and the stem and its screw-nut $m$, so that a guard or stop will be produced, against which the teeth of the saw will abut, and thus stop it at the right depth for setting the teeth.

In adjusting this implement for use on any particular saw, the blade of the saw is first inserted so as to bring its toothed edge against the slide C; and the proper inclination of the blade, to give the desired degree of set in the teeth, is produced by adjusting the height of the rest-screw $i$, upon which it rests; then closing the jaws of $d$ and $e$ until the die nearly touches the tooth which is to be set or bent down upon the anvil $k$; and, finally, rotating the nut $g$ so as to bring the lower end of the stem $f$ into strong bearing contact with the blade of the saw. The implement, having thus been adjusted, will be ready for the operation of setting or bending the teeth down upon the anvil, which is readily accomplished by the operator firmly compressing the levers $d$ and $e$ toward each other, as in closing a pair of pinchers. The spring A is intended to be stiff enough to prevent any rising or tilting up of the blade of the saw by the pressure of the die in bending or setting the tooth, and at the same time weak enough to allow the stem $f$ and nut $g$ to yield to the full pressure of a strong hand-griping, and compressing toward each other the levers $d$ and $e$ in setting down the tooth; and hence the advantage of our saw-set consists in the fact that the saw-blade will always be held firmly before the die comes in contact with and bends the tooth down upon the anvil, and, firmly holding it down with increasing power, the bending operation upon the tooth while the blade is held firmly, as described, will be gradual and steady, or not liable to break off the teeth, as is the case with the pincher-sets, in which the bending of the tooth and the clamping of the blade are simultaneously produced.

Having thus fully described our improvement in pincher saw-sets, what we believe to be new therein, and desire to secure by Letters Patent, is confined to the claim herein following, viz.:

We claim as our invention—

The spring A, and the screw-threaded regulating-pin B, and nut $g$, in combination with the upper jaw $d$ of a pincher saw-set, the said parts being constructed and arranged to operate upon the saw-plate or blade, substantially as and for the purpose hereinbefore set forth.

ALBERT HARPER.
JOHN WÜRFFLEIN.

Witnesses:
A. WILHELM,
H. VOIGT.